Dec. 19, 1933.     C. SPAETH     1,940,064
DISPENSING APPARATUS
Filed June 21, 1932     2 Sheets-Sheet 1
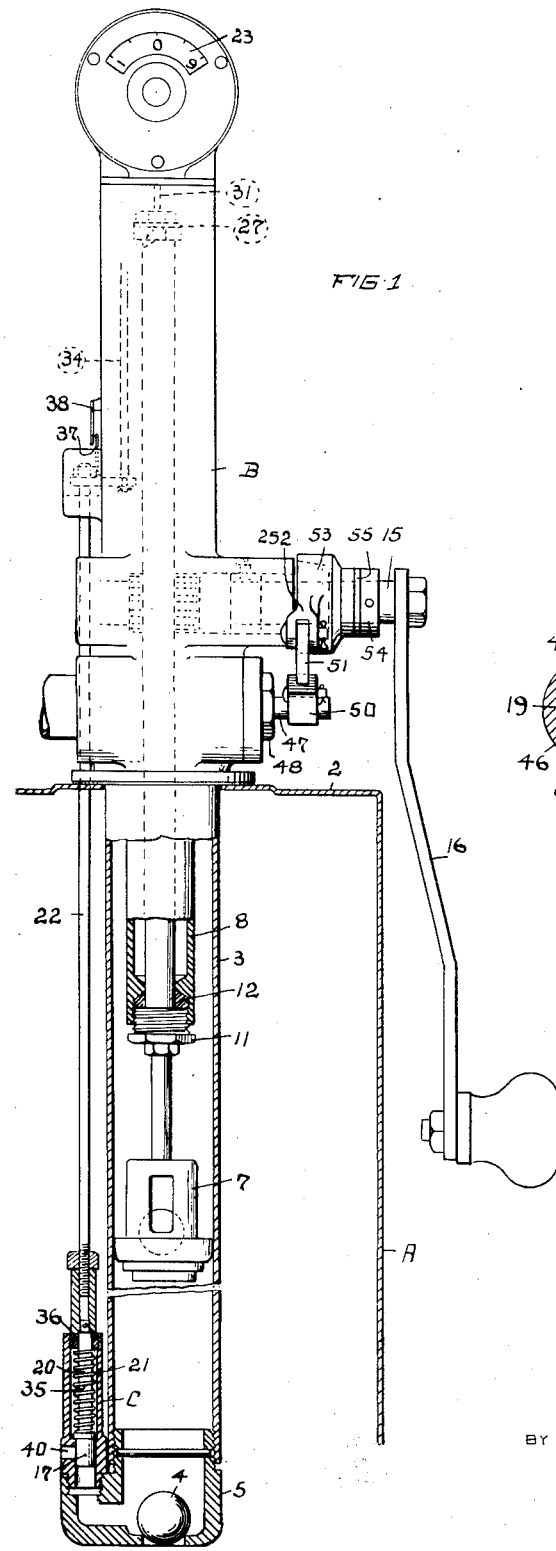
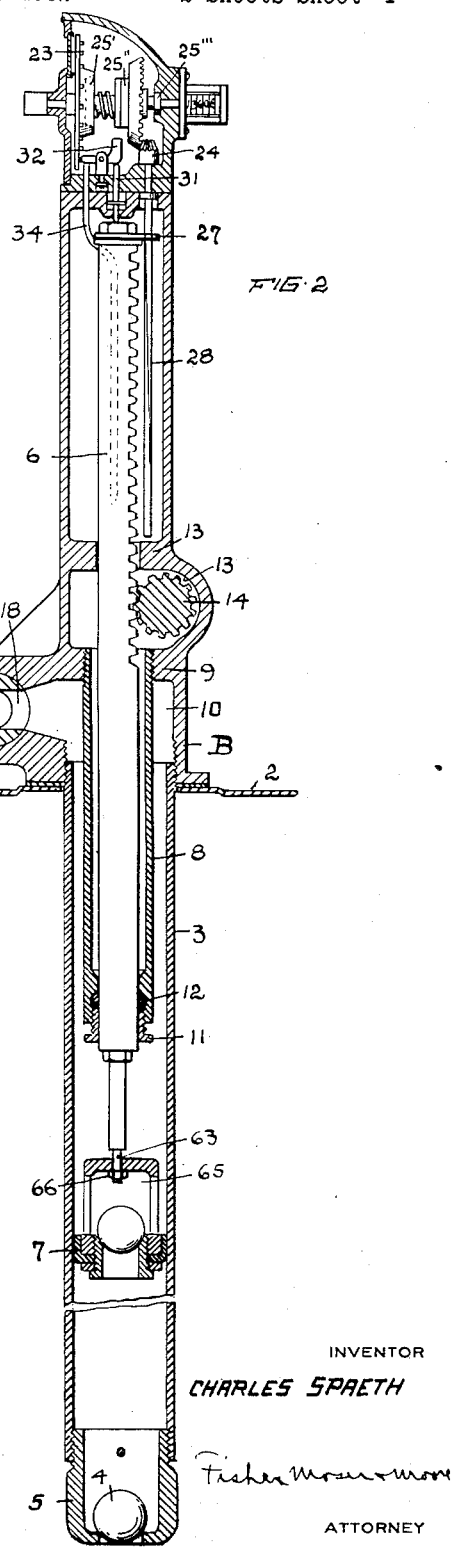
INVENTOR
CHARLES SPAETH
BY
Fisher Moser Moss
ATTORNEY Dec. 19, 1933.     C. SPAETH     1,940,064
DISPENSING APPARATUS
Filed June 21, 1932     2 Sheets-Sheet 2
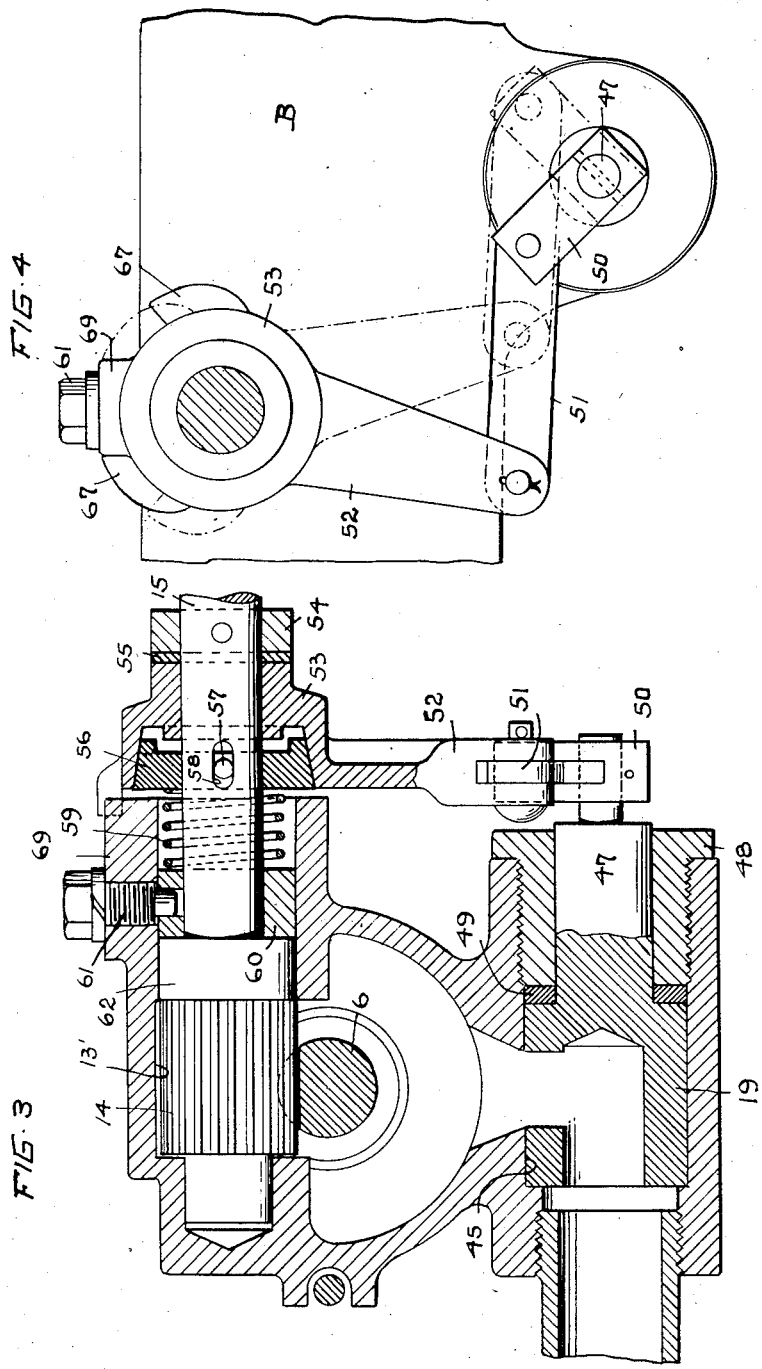
INVENTOR
CHARLES SPAETH
BY
ATTORNEY Patented Dec. 19, 1933

1,940,064

UNITED STATES PATENT OFFICE 1,940,064

DISPENSING APPARATUS

Charles Spaeth, Cleveland, Ohio

Application June 21, 1932. Serial No. 618,547

5 Claims. (Cl. 221—102)

This invention relates to dispensing apparatus, and more particularly to a reciprocable pumping apparatus for dispensing measured charges of oil, grease, liquid, or semi-liquid substances and is an improvement of a dispensing apparatus such as described and shown in my co-pending applications for patents, Serial Nos. 445,900, and 578,492, filed April 21, 1930 and Dec. 2, 1931, respectively. In general, the object is to provide a dispensing apparatus which will effect correct measurement, eliminate error, indicate to the operator and customer when correct measure is not dispensed, especially indicate when the tank is empty, and to register and plainly indicate at the pump the total amount of lubricant being delivered to a customer, thus safeguarding the purchaser from deception and fraud in dispensing operations.

One of the main features of the present invention is the provision of means for automatically actuating the discharge nozzle valve to the open and closed positions necessary to the proper functioning of the pump, thus eliminating the danger of damage to the pump or the delivery of short measure due to mistake or fraud on the part of the operator.

In dispensing devices which deliver grease or oil from an invisible supply through a flexible hose, having a delivery nozzle or spout, into a closed receiving vessel, such as a gear housing, transmission case, or the like, the purchaser has no means of knowing the exact amount of the charge delivered. The present apparatus has been especially designed to indicate the exact charge and to prevent fraud. Thus, a charge of lubricant is drawn into an oversized measuring chamber and thereafter placed under more or less compression to assure a correct charge preliminary to dispensing same. Provision is made for by-passing or returning the lubricant in excess of the correct charge to the supply receptacle, and a loading or charging indicator is provided which is operatively dependent upon the pressure conditions in the pump, so that purchaser and attendant may determine whether the pump has been accurately charged, and be advised when the tank or container is empty and the supply depleted or exhausted.

Furthermore, the present pump includes means for indicating the amount of lubricant delivered during each individual sale or dispensing operation, and a counter device registering the total amount of lubricant dispensed is also embodied therein. The two indicating and counting devices are actuated automatically by the reciprocating plunger of the pump, which respectively controls the customer's indicator and the counter device.

The customer's indicator is resettable but as it is desirable to make it impossible to reset the indicator until the pump is fully charged, special mechanism is provided for automatically locking such indicator preliminary to charging or filling the pump, and thereafter when the pump is fully charged to unlock the indicator so that inadequate filling of the pump causes the indicator to remain locked. The controlling means for by-passing any surplus amount of lubricant over and above the predetermined charge and for the loading or charging indicator as well as for the rotatable customer's indicator, consists according to the present invention of a pressure operated device. Thus, the device is arranged close to the lower end of the dispensing apparatus, at a place where the attendant cannot fraudulently manipulate the same, all as hereinafter more fully described in the following description of the exemplified form of dispensing apparatus shown in the drawings forming part of this description.

In these drawings, Figure 1 is a side view partly in section of a dispensing apparatus embodying the invention;

Figure 2 is a transversal section view through the dispensing apparatus shown in Figure 1;

Figure 3 is a sectional view on line 3—3 of Figure 1 showing the coupling between the pinion shaft and the valve; and Figure 4 is a side view of the coupling connection between the pinion shaft and the valve.

The apparatus comprises a tank or receptacle A of any suitable character adapted to hold a supply of the lubricant to be dispensed. A pump body B is affixed to a cover 2 for this receptacle, and a cylindrical barrel or tube 3 is connected to the bottom of the pump body and extends downwardly into the receptacle nearly to its bottom, where an L-shaped extension 5, threadedly connected with said tube, is provided with a check valve 4. A toothed rack member 6 carrying a plunger or piston 7 is reciprocably confined within the barrel or tube 3, and this rack member is supported to slide within a smaller and shorter tube 8 which is threadedly connected at its upper end to an internal boss 9 within the receiving chamber 10 of pump body B. A nut 11 and packing ring 12 at the lower end of pipe 8 provides a closure member for the pipe and a bearing for the lower end of rack member 6.

The upper end of this rack member extends through a second bearing wall 13 in the pump body above a transverse bore or recess 13' housing a pinion 14, integral with a rotatable shaft 15, having a crank handle 16. The piston may be reciprocated manually by the means described for drawing charge of lubricant into the cylinder from tank A upon a full upward stroke of plunger. This charge is transferred from the lower end of the cylinder 3 to the upper end thereof and also into the hollow bottom of the pump body B upon the reverse or down stroke of plunger. To insure that the amount of lubricant transferred from the lower to the upper part of the pump cylinder upon the downward stroke of the piston represents full measure, such amount is preferably in excess of the correct measure, the surplus being returned or fed back into the tank or receptacle A by way of a by-pass passage 40 in extension 5 of tube 3. To this end passage 40 is controlled by a spring-pressed valve 17 adjusted to open under a predetermined pressure during the down stroke of the piston, when the discharge outlet 18 of the pump body A is closed by rotatable valve 19. During this interval a piston 20 carrying valve 17, confined within the cylindrical body portion 21 of the operating means C is exposed to the charge of lubricant under pressure within the pump cylinder. Accordingly, this small piston is moved upwardly against the pressure of spring 35 when a predetermined pressure condition is reached within the cylinder 3, thereby raising an upright member or rod 22, fixed to the upper protruding end of piston 20. The upward movement of piston 20 occurs only when a full charge of lubricant is present in the pump cylinder 3. The upward movement of rod 22 is utilized to unlock or permit of the rotatable movement of an indicating dial 23 mounted upon the upper end of hollow body B. Dial 23 informs the purchaser and operator as to the accuracy of the amount of lubricant dispensed. Moreover, the dial will stay locked whenever the supply is inadequate or exhausted, all as more specifically described and brought out in my co-pending application, Serial No. 494,460, filed November 10, 1930.

Thus, dial 23 is rotated automatically in one direction by a train of clutch controlled driving means 24, 25 which are operatively dependent upon the reciprocable movement of pump piston 7 and its operating rack member 6. As shown, a perforated plate 27 is fixed to the upper end of rack member 6 to slidably engage and rotate a flat-sided twisted bar or spiral shaft 28 whenever the crank handle is turned to operate. Shaft 28 extends into the hollow upper end of body 2 closely adjacent and parallel to rack member 6, and is square in cross section to fit the opening in plate 27 through which it extends. Driving member 24, in the form of a beveled pinion gear, is secured to the upper end of shaft 28 and meshes with a larger driving bevel gear 25 and drives either the indicating dial 23 or a recording device, such as a Veeder counter 30. Rotation of shaft 28 in clock-wise direction during the upward stroke of rack bar 6 causes the indicating dial 23 to turn, whereas rotation in anti-clockwise direction affects rotation of the Veeder counter 30, a series of clutches 25', 25'', and 25''' being provided to permit of automatic selective rotation of the indicating dial and the Veeder counter.

Upon each up stroke of the pump piston a charge is dispensed and the indicating dial 23 is rotated in an anti-clockwise direction by gear 25. Locking of the dial is effected at the end of the dispensing stroke, while unlocking of the dial takes place when the piston and rack bar are lowered, providing the pump cylinder contains a full charge. During the up stroke of the pump piston and its rack member 6, the latter engages a short pin 31, shortly before the end of its stroke is reached, and forces this pin upwardly against one end of a pivoted locking dog or pawl 32, thus tilting this dog into wedging engagement with dial 23. To unlock dial 23 dog or pawl 32 is tilted in reverse direction, such tilting movement being effected through a push rod 34, connected to the pressure controlled piston 20 and extending upwardly through hollow body B into engagement with the locking end of the dog or pawl 32. In operation, rod 34 and piston 20 are raised only when a full charge of lubricant is present within the pump and a predetermined pressure exists, as controlled by the pressure by-pass valve 17 forming part of piston 20.

The pressure controlled piston 20 is held by the compression spring 35 from moving upwardly except under given pressure conditions. Thus, the tension of spring 35 may be adjusted by a nut 36 screw-engaged with body 21 of operating device C to permit uplift of piston 20 only when a predetermined pressure exists within pump cylinder 3. When delivering lubricant piston 20 is always down thereby keeping an indicator plate 37 out of sight behind a slotted screen 38 (see Fig. 1). This plate 37 is connected with the upper end of rod 22 and bears a suitable inscription such as "charge" to show that the pump cylinder is fully charged and the apparatus is in working condition to deliver correct measure. In case of excess pressure being developed while transferring the charge from the lower part of cylinder 3 into the upper part thereof and into the hollow bottom of the pump body, piston 20 is elevated to a greater degree thus opening the by-pass valve opening 40 and permitting the surplus charge to be by-passed back into the tank or receptacle A.

In the operation of the construction just described it of course is necessary for the operator to manually close valve 19 before the piston or plunger is started on its down or compression stroke, as otherwise there would be a loss of pressure and the by-pass piston valve 17 would not function to by-pass excess lubricant over and above the desired quantity or charge to be dispensed from the upper portion of cylinder 3. Likewise, it is of course necessary for the attendant to manually open the valve 19, before starting the piston on its up or dispensing stroke, but should he neglect to do so the pump parts would be subjected to undue strain, and of course no lubricant would be dispensed. In order to remove the human equation from the operation of valve 19, thus exterminating the element of fraud and also leaving the operator free to manipulate crank handle 16 in a continuous manner, means are provided for the automatic opening and closing of this valve during a rest or inactive period which is created at the end of each stroke of the piston.

Accordingly, valve 19 is operatively connected to crank shaft 15 by a system of clutch controlled levers about to be described. Valve 19 which is rotatably mounted in the transverse bore 45 of an enlargement 46 formed on the pump body B adjacent one side of but slightly below the bore 13', is formed with an elongated stem 47. A nut 48, which closes one end of the bore 45 and presses the resilient packing ring 49 against the stem, also serves as a bearing for the latter. A lever 50 fixed to the outer end of valve stem 47 is pivotally connected through a link 51, with a lever arm 52 integrally formed with and depending from the cone shaped female member 53 of a clutch mechanism. Member 53 is sleeved upon crank shaft 15 for slight inward movement but is confined against outward movement by a fixed collar 54. A washer 55 is preferably positioned between the member 53 and collar 54 for an obvious purpose.

A disk shaped male clutch member 56 is secured to the crank shaft 15 for limited sliding movement thereon toward and away from clutch member 53, by means of a pin 57 which passes loosely through a relatively large opening 58 in the shaft. This clutch member 56 is constantly pressed in an outwardly direction along shaft 15, toward and into frictional contact with female clutch member 53, by means of a coil spring 59, such movement being of course limited to a distance equal to the length of opening or slot 58. Spring 59 bears at one end against the clutch member 56 and at the other end against a lock collar 60, which serves as a bearing for the crank shaft 15 and also prevents withdrawal of the latter, from transverse bore or recess 13' into which the shaft extends. A screw 61 confines the collar 60 against the shouldered portion 62 of pinion 14 and also locks the collar against rotation with the crank shaft.

When crank shaft 15 is rotated, female clutch member 53 will rotate with shaft 15 by virtue of the pin connection between the shaft and male clutch member 56 and the frictional driving engagement of the latter with female member 53, and consequently the valve 19 will be automatically turned to open or closed position depending upon whether the crank is turned in a clockwise or anti-clockwise direction. As any rotary movement of the shaft 15 results in a corresponding vertical movement of piston rod 6, it is of course necessary that there be some lost motion or play between the piston 7 and piston rod 6, in order that the valve 19 may be fully opened or closed before the piston commences to function. Thus, the reduced lower end 63 of piston rod 6 is extended a predetermined distance (approximately one-quarter of an inch) through and beyond opening 64 in the cage portion 65 of piston 7 and confined against displacement by a nut 66 keyed to the extremity of said reduced portion. This play of one-quarter of an inch is just sufficient to enable the valve 19 to be opened or closed before the piston will commence to move into the piston rod. Rotary movement of the clutch member 53 with member 56 and the crank shaft is checked when a lug 69 formed on member 53 engages one or the other of a pair of lugs 67 mounted on the pump housing. The distance between lugs 67 corresponds to the quarter inch play between the piston and piston rod so that the opening and closing of valve 19 is not interfered with. Although movement of clutch member 53 is stopped when lug 66 contact with one of lugs 67, clutch member 56 will of course continue to rotate with the crank shaft and relatively to the clutch member 53 as the functional contact between the two clutch members is such that comparatively little additional resistance is offered to the normal operation of the crank handle.

What I claim, is:

1. In an apparatus for dispensing predetermined quantities of fluid, a chamber having a cubic volume in excess of the amount of fluid to be dispensed, a valve controlled discharge passage and a by-pass passage for said chamber, means to deliver a charge into said chamber, means to decrease the cubic volume of said chamber and by-pass any excess of fluid in said charge over and above the predetermined quantity to be dispensed, and means directly actuated by said charge delivery means to automatically open and close the valve in said discharge passage.

2. In an apparatus for dispensing predetermined quantities of fluid, a chamber having a cubic volume in excess of the amount of fluid to be dispensed, a valve controlled discharge passage and a by-pass passage for said chamber, means to deliver a charge into said chamber, means to decrease the cubic volume of said chamber and by-pass any excess of fluid in said charge over and above the predetermined quantity to be dispensed, and means coupled with said charge delivering means to automatically open and close the valve in said discharge passage.

3. In an apparatus for dispensing predetermined quantities of fluid, a chamber having a cubic volume in excess of the amount of fluid to be dispensed, a valve controlled discharge passage and a by-pass passage for said chamber, means including a valved piston to deliver a charge into said chamber, means to decrease the cubic volume of said chamber, said last mentioned means being coupled to said piston with freedom for slight independent movement relative thereto, and automatic means to open and close the valve in discharge passage during the intervals of said independent relative movement.

4. In an apparatus for dispensing predetermined quantities of fluid, a piston chamber having a cubic volume in excess of the amount of fluid to be dispensed, a valve controlled discharge passage and a by-pass passage for said chamber, reciprocable piston means within said piston chamber, operating means for said piston means, coupling means between said piston means and said operating means permitting slight relative movements of said operating means and said piston means with respect to each other and means coupled with said operating means to open and close the valve in said discharge passage when said piston means and said operating means are shifted with respect to each other.

5. In an apparatus for dispensing predetermined quantities of fluid, a piston chamber having a cubic volume in excess of the amount of fluid to be dispensed, a valve controlled discharge passage and a by-pass for said chamber, means to decrease the cubic volume of said chamber and deliver a charge into said chamber including a reciprocable piston means within said piston chamber, operating means for said piston means, coupling means between said piston means and said operating means permitting slight relative movement of said operating means and said piston means with respect to each other, and means coupled with said operating means including a clutch and lever to open and close the valve in said discharge passage when said piston means and said operating means are shifted with respect to each other.

CHARLES SPAETH.